(12) United States Patent
Stiles et al.

(10) Patent No.: US 10,430,524 B1
(45) Date of Patent: Oct. 1, 2019

(54) CONSTRUCTING MULTI-ELEMENT FEATURES USING A 3D CAD SYSTEM

(71) Applicant: Dassault Systemes SolidWorks Corporation, Waltham, MA (US)

(72) Inventors: Jody Todd Stiles, Northborough, MA (US); Satish Rao Kanjarkar, Billerica, MA (US); Sachin Darwatkar, Pune (IN)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 287 days.

(21) Appl. No.: 15/447,774

(22) Filed: Mar. 2, 2017

Related U.S. Application Data

(63) Continuation of application No. 15/382,220, filed on Dec. 16, 2016.

(51) Int. Cl.
| | |
|---|---|
| *G06F 17/50* | (2006.01) |
| *G06T 19/20* | (2011.01) |
| *G06T 17/20* | (2006.01) |
| G06F 3/0484 | (2013.01) |
| G06T 17/00 | (2006.01) |
| G06T 17/10 | (2006.01) |
| G06T 19/00 | (2011.01) |
| G06F 16/583 | (2019.01) |

(52) U.S. Cl.
CPC ............ *G06F 17/50* (2013.01); *G06T 17/205* (2013.01); *G06T 19/20* (2013.01); *G06F 3/0484* (2013.01); *G06F 16/5854* (2019.01); *G06F 2217/02* (2013.01); *G06F 2217/06* (2013.01); *G06T 17/00* (2013.01); *G06T 17/10* (2013.01); *G06T 19/00* (2013.01); *G06T 2200/04* (2013.01); *G06T 2200/24* (2013.01); *Y10S 715/964* (2013.01)

(58) Field of Classification Search
None
See application file for complete search history.

(56) References Cited

U.S. PATENT DOCUMENTS

| | | | | |
|---|---|---|---|---|
| 5,586,052 A | * | 12/1996 | Iannuzzi | G06F 17/50 345/440 |
| 6,898,560 B1 | * | 5/2005 | Das | G06F 17/50 703/22 |
| 7,688,318 B2 | * | 3/2010 | O'Malley, III | G06F 17/50 345/420 |

(Continued)

OTHER PUBLICATIONS

SolidWorks World 2016 https://youtu.be/nEPso8z87nE [Retrieved on Aug. 2, 2017].

*Primary Examiner* — Kibrom K Gebresilassie
(74) *Attorney, Agent, or Firm* — Hamilton, Brook, Smith & Reynolds, P.C.

(57) ABSTRACT

A computer-implemented method and system creates a multi-element feature in a three-dimensional (3D) computer-aided design (CAD) model. A first element and a second element are selected to include in the multi-element feature. A single sketch is created comprised of sketch entities, a subset of which defines the first element and another subset of which defines the second element. A connection entity is included in the single sketch. The connection entity joins the first and the second elements. A modeling operation applied to the single sketch creates the multi-element feature.

19 Claims, 13 Drawing Sheets
(5 of 13 Drawing Sheet(s) Filed in Color)

(56) References Cited

U.S. PATENT DOCUMENTS

| | | | | |
|---|---|---|---|---|
| 10,140,392 B1* | 11/2018 | Bowen | G06F 17/50 | |
| 2003/0204285 A1* | 10/2003 | Thomas | G05B 19/4097 | 700/182 |
| 2003/0204286 A1* | 10/2003 | Thomas | G05B 19/4097 | 700/182 |
| 2008/0188969 A1* | 8/2008 | O'Malley | G06F 17/50 | 700/97 |
| 2008/0234991 A1* | 9/2008 | Axling | G06F 17/50 | 703/1 |
| 2008/0246762 A1* | 10/2008 | Ogata | G06T 3/00 | 345/420 |
| 2009/0204373 A1* | 8/2009 | Brown | G06F 17/50 | 703/1 |
| 2009/0319068 A1* | 12/2009 | Sager | A61C 13/0022 | 700/98 |
| 2010/0010655 A1* | 1/2010 | Corcoran | G06F 17/50 | 700/98 |
| 2010/0302242 A1* | 12/2010 | Buchanan | G06F 17/50 | 345/420 |
| 2014/0313216 A1* | 10/2014 | Steingrimsson | G06K 9/00402 | 345/589 |
| 2015/0213154 A1* | 7/2015 | Toebben | G06F 17/50 | 703/1 |
| 2016/0116911 A1* | 4/2016 | Yamamoto | G06F 16/9024 | 700/98 |
| 2017/0066092 A1* | 3/2017 | Yamamoto | B23P 21/00 | |
| 2018/0173815 A1 | 6/2018 | Stiles et al. | | |
| 2019/0096116 A1* | 3/2019 | Cheong | G06T 15/02 | |

* cited by examiner

| Element Type | Sketch | Constraints |
|---|---|---|
| Counterbore | Ø.56, .17 | Fixed<br>Collinear<br>Horizontal<br>Vertical |
| Countersink | 100.00°, Ø.51, .10 | Fixed<br>Collinear<br>Horizontal<br>Vertical<br>Symmetric |
| Taper Threaded | 3.43°, Ø.49, .15 | Fixed<br>Collinear<br>Horizontal<br>Vertical<br>Symmetric |
| Straight | 118.00°, Ø.25, .25 | Fixed<br>Collinear<br>Horizontal<br>Vertical<br>Symmetric<br>Coincident |
| Straight Threaded | 118.00°, Ø.20, .20 | Fixed<br>Collinear<br>Horizontal<br>Vertical<br>Symmetric<br>Coincident |

FIG. 6

CONSTRUCTING MULTI-ELEMENT FEATURES USING A 3D CAD SYSTEM

RELATED APPLICATION(S)

This application is a continuation of U.S. application Ser. No. 15/382,220 filed Dec. 16, 2016. The entire teachings of the above application(s) are incorporated herein by reference.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to topological faces bounded by edges. Hereinafter, the terms vertex, edge, and face will be used interchangeably with their respective, corresponding geometric entities.

In general, a solid model consists of various features created by modeling operations. For example, a solid model may include a boss created by an extrude operation applied to a two-dimensional (2D) sketch and a hole created by a cut operation applied to a 2D sketch. In addition to bosses and holes, features include fillets, shells, sweeps, and chamfers by way of non-limiting example. In general, the time it takes to rebuild a model (e.g., updating a model after executing a modeling operation) increases in proportion to the number of features in the model.

CAD systems may combine solid modeling and other modeling techniques, such as parametric modeling techniques. Parametric modeling techniques can be used to define various parameters for different features and components of a model, and to define relationships between those features and components based on relationships between the various parameters. After a user has made a change to one or more parameters of the features, CAD systems may automatically rebuild a model from the features. Feature-based solid modeling allows for powerful editing capabilities during the design process, due in part to the inherent parametric characteristics.

A design engineer is a typical user of a 3D CAD system. The design engineer designs physical and aesthetic aspects of 3D models, and is skilled in 3D modeling techniques. The design engineer creates 3D parts and may assemble the 3D parts into a subassembly or an assembly. A subassembly may also consist of other subassemblies. An assembly is designed using parts and subassemblies. Parts and subassemblies are hereinafter collectively referred to as components.

A commonly used feature in a part model is a hole feature. A hole feature may be created by constructing a 3D cylindrical object having a specific diameter and applying that object to one or more parts using a cut operation, for example. Holes often have standard shapes. The SOLIDWORKS® Hole Wizard software tool allows a user to create a hole having a standard shape. The Hole Wizard has a library of pre-defined hole types. A user may select a hole type, specify parameters for an instance of that hole type, and the SOLIDWORKS CAD system will then create a hole. For example, the Hole Wizard enables a user to insert from a library a counterbore hole, a countersink hole, a straight tap hole, and a tapered tap hole into a part design. The user may also specify various parameters, including the diameter of the hole, the depth of the hole, and the angle of a tapered opening.

Holes may also have non-standard shapes. A hole may contain multiple features. Multi-feature holes are common in assemblies designed for many industries, for example, hydraulic systems in the heavy machinery industry. Such holes may be complex. For example, instead of a simple cylindrical hole or a hole created from an object in a pre-defined hole library, one complex hole design may include a series of hole features having different shapes with various diameters and end conditions. One or more of these hole features may include tapered ends that meet another hole feature that has a different diameter than the ends. To create a complex hole that incorporates multiple hole types, a user may need to create a 2D sketch for each hole type, then revolve or extrude the sketch to create a feature. A customized hole feature may also be added from a library (e.g., using the SOLIDWORKS® Hole Wizard tool). The difficulty with this approach is the burden placed on the user to create a complex series of sketches and features to create one desired hole. With the exception of library features (e.g., pre-defined Hole Wizard features), during the part design phase for each occurrence of a hole feature in a complex hole, the user may need to create a sketch and have a modeling operation applied to that sketch. Although, individual features comprising the complex hole may be saved in a design library for future use.

A further drawback of the current state of the art is the difficulty of recognizing and correcting an error that causes the construction of a complex multi-featured hole to fail. A failure may occur when a constraint cannot be solved or a modeling operation produces an error. Locating and resolving the cause of the failure in the hole design is often difficult and may be impossible. Sometimes a user can take a step-by-step approach consisting of selecting an edge or a face amongst the hole features that comprise the complex hole to determine if that edge or face is causing the failure. This approach, however, may require the user to delete and re-create features that comprise the complex hole to find the error.

At times, a CAD user may wish to create a hole comprised of two or more desired hole features that originate from two opposite or different sides of a 3D part. This may be done to imitate a manufacturing process whereby one complex real-world hole is drilled from two different directions so that the dimensions and tolerances of the real-world hole match the required dimensions and tolerances for each end of the real-world hole.

If the depths of the holes are specified exactly, the depths will not update when the base model geometry changes (e.g., gets thicker) unless the user has written an equation or created one or more external geometric references. When creating a multi-feature hole from two different directions, the prior art may require the user to manually calculate the required depths of one or more of the hole features. For example, a user may need to calculate the depth of each of two middle hole features of a four-feature hole from one or both of the end hole features. Although the proper depths may be calculated and entered by the user, the values are not parametric and do not update dynamically. Rather, the user must write an equation to update the values when the model changes.

A further drawback with the prior art is the difficulty in manually reordering independent hole features that comprise a complex hole, which are separate features that may have originated from a pre-defined hole feature in a feature library or a manually drawn sketch. To reorder features in the complex multi-featured hole, one or more hole features in a library may need to be accessed and incorporated again and a complex sketch may need to be redrawn then revolved to construct a hole feature. A difficulty in reordering features in a multi-feature hole is due to the number of internal and external references involved (e.g., dimensions and geometric references), which often causes unexpected downstream geometry failures that then must be repaired by the user.

A further disadvantage in the prior art is the time-consuming nature of creating multiple features to construct a desired hole. Moreover, the file size of the model data and rebuild times increase with each new feature.

A system and method that overcomes the disadvantages of requiring piecewise construction and re-construction of hole geometry for a complex hole, and reduces the need to perform the often difficult tasks of identifying failed geometry, updating a feature in a multi-feature hole in response to another feature of the multi-feature hole being updated, and reordering hole features would be a beneficial improvement over current state-of-the-art CAD systems.

SUMMARY OF THE INVENTION

In general, in one aspect, embodiments of the present invention feature a computer-implemented method for constructing a multi-element feature in a three-dimensional (3D) computer-aided design (CAD) model. The method includes selecting a first and a second element to include in the multi-element feature and creating a single sketch that defines a shape of the multi-element feature. The single sketch includes a set of sketch entities, where the first and second elements are defined by a first subset of the sketch entities and a second subset of the sketch entities, respectively. A connection entity is included in the set of sketch entities and joins the first and second elements. Applying a modeling operation to the single sketch results in the creation of the multi-element feature.

Other embodiments include a non-transitory computer-readable data storage medium and a CAD system, each having instructions that cause a computer to select a first element type and a second element type to include in a multi-element feature in a 3D CAD model, specify parameters for the first and the second element types, and construct a single sketch defining a shape of the multi-element feature. The single sketch includes a first subset of sketch entities and a second subset of entities defining the first and the second elements, respectively. The single sketch also includes a connecting entity that joins the first element and the second element in the single sketch. Further instructions apply a modeling operation to the single sketch to create the multi-element feature.

Further aspects of the invention include selecting an additional element to include in the multi-element feature. The single sketch is then recreated to include additional sketch entities defining a profile of the additional element, or the additional sketch entities can be added to the set of sketch entities thereby modifying the single sketch.

Yet another aspect of the invention is that the connection entity can be a single sketch entity that replaces an end sketch entity in the first subset of the sketch entities and a beginning sketch entity in the second subset of the sketch entities, the same point, or two coincident points. Furthermore, the connection entity can be a new sketch entity that joins an end sketch entity in the first subset of the sketch entities and a beginning sketch entity in the second subset of the sketch entities.

Additionally, an end condition can be created to cause an automatic update in the second element when a parameter of the first element changes; the automatic update keeps the first element and the second element joined.

Another aspect of embodiments of the present invention includes detecting an error condition in the single sketch and displaying a wireframe preview of the single sketch, where the wireframe preview visually depicts the error. And yet another aspect comprising reordering the first and the second elements, where reordering recreates the single sketch with the first subset of the sketch entities and the second subset of the sketch entities rearranged accordingly.

Additionally, an embodiment includes creating a first subgroup and a second subgroup of sketch entities corresponding to the multiple elements. The first subgroup contains the first subset of sketch entities and a third subset of sketch entities that define a third element. The second subgroup contains the second subset of sketch entities and a fourth subset of sketch entities that define a fourth element. The first subgroup of sketch entities (and corresponding elements) and the second subgroup of sketch entities (and corresponding elements) are updated independently, and the sketch entities (and corresponding elements) in the first subgroup are joined with the sketch entities (and corresponding elements) in the second subgroup by implementing an up-to-next element end condition.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same objects throughout the different views. The drawings are not necessarily to scale, emphasis instead being placed upon illustrating embodiments of the present invention.

FIG. 6 is a table showing element types and sketches of element types.

DETAILED DESCRIPTION OF THE INVENTION

The present invention addresses the problem of how to easily construct and modify a multi-element feature using a three-dimensional (3D) computer-aided design (CAD) system.

The present invention creates a complex multi-element feature with configurable elements, where each element may originate from a two-dimensional (2D) or 3D sketch. Data defining the elements are arranged in a data structure and the data is used to create a desired multi-element feature. Moreover, multiple holes may be created from one multi-element feature in a 3D model; that is, a single feature may have multiple instances on one or more faces of a 3D model. The underlying data structure may be implemented as an array or linked list of elements that may easily be re-ordered. The data structure stores all parameters required to define an element such as depth, diameter, and angle with links to adjoining elements, if any. The user may select an element from a pre-defined library of elements and may create an element after constructing an underlying sketch of the element. The present invention enables each element in the feature to correctly interact and connect with other contiguous elements, thereby reducing the effort required by a user to redefine and redraw the required profiles of the elements, and/or reselect elements from a library.

Figure 1:
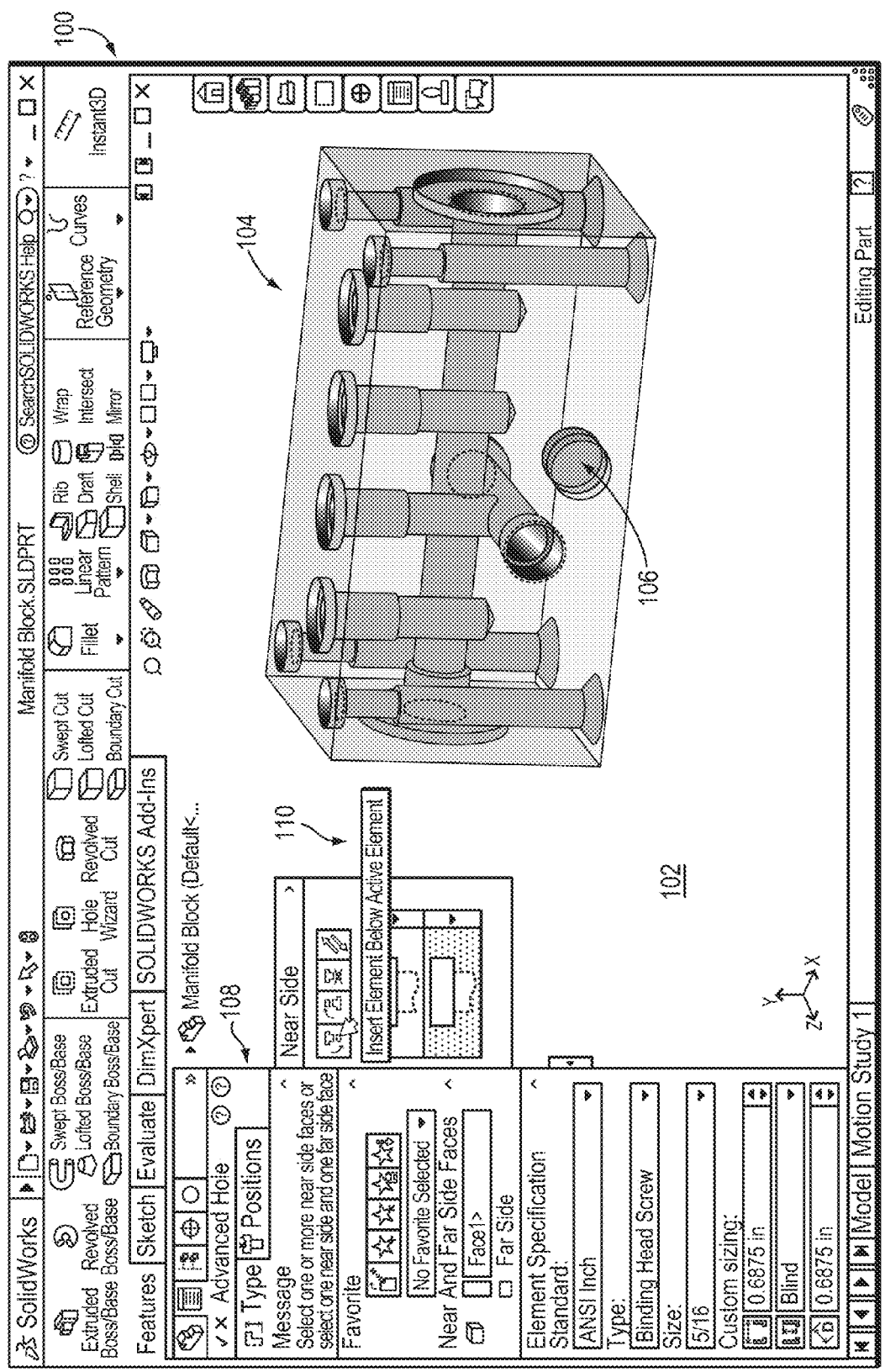
FIG. 1 is an illustration of a three-dimensional part in an embodiment of the present invention.

Referring now to FIG. 1, a window 100 is illustrated. The window 100 is created and displayed by a 3D CAD system. The 3D CAD system consists of computer hardware and software, is used to design and modify CAD models and components thereof, and implements the present invention described herein.

In a modeling portion 102 of the window 100 is a 3D part model 104 of a manifold block, with two counterbore hole elements, including a first counterbore hole element 106 of a multi-element hole feature. A property manager 108 for the multi-element hole feature defines various properties for the elements in the multi-element hole feature. The property manager 108 includes a user interface (UI) fly-out 110. The UI fly-out 110 defines the order and types for near and far side elements of a multi-element hole feature. As shown, two counterbore hole elements of the multi-element hole feature are constructed on the near side of the 3D part model 104 and no elements have been defined on the far side. The UI fly-out 110 also has a set of controls (e.g., UI buttons) to enable a user to select whether the new hole element is to be inserted above or below the currently selected element in the 3D part model 104. Other controls enable the user to instruct the CAD system to delete a hole element and to reverse the direction of the elements.

Figure 2:
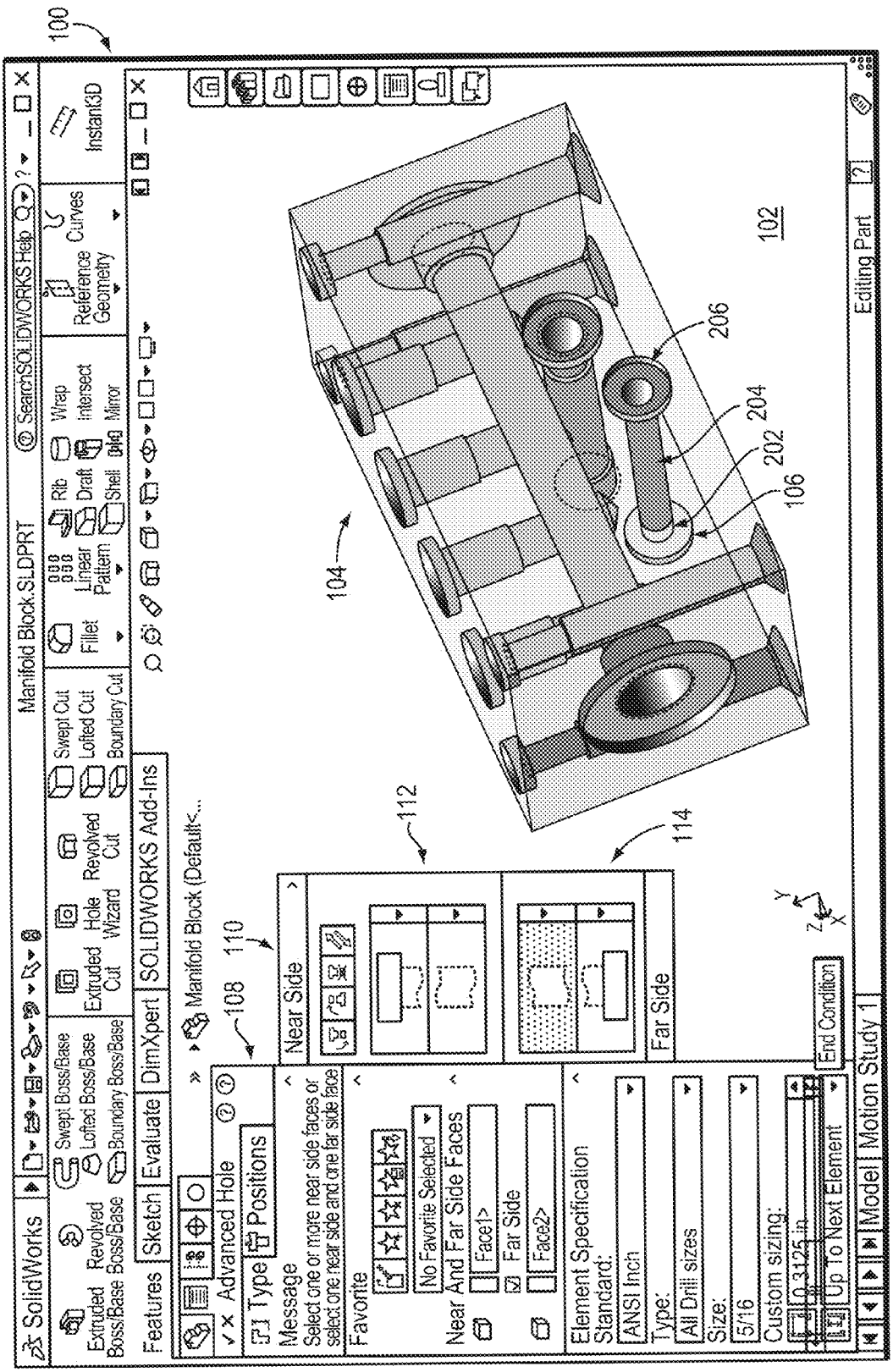
FIG. 2 is an illustration of a three-dimensional part in an embodiment of the present invention.

Referring now to FIG. 2, the UI fly-out 110 is divided into two sections, a near side section 112 and a far side section 114 that correspond to the near and far sides of the respective hole and the respective part. (In FIG. 2, 3D part model 104 has been rotated such that the near side of the part and multi-element hole feature are further from the viewer than the far side of the part and multi-element hole feature. The user may choose which section a selected hole element will be inserted. In FIG. 2, two hole elements have been added to the near side (i.e., the first counterbore hole element 106 and a first straight hole element 202 specified to replace the other near side counterbore hole element in FIG. 1), and two hole elements have been added to the far side (i.e., a second counterbore hole element 206 and a second straight hole element 204). As illustrated, the overall multi-element hole definition is intuitively displayed in the UI fly-out 110 as a visual stack of hole elements, with the active hole element highlighted (e.g., shaded gray as in FIGS. 1 and 2). Thus, the depiction of the hole elements is ordered according to their positions in the multi-element hole. The elements in the visual stack of hole elements may be dragged using a cursor-controlled device to reposition the elements in the element stack, which automatically reorders the elements in the multi-element hole in 3D part model 104.

Figure 3A:
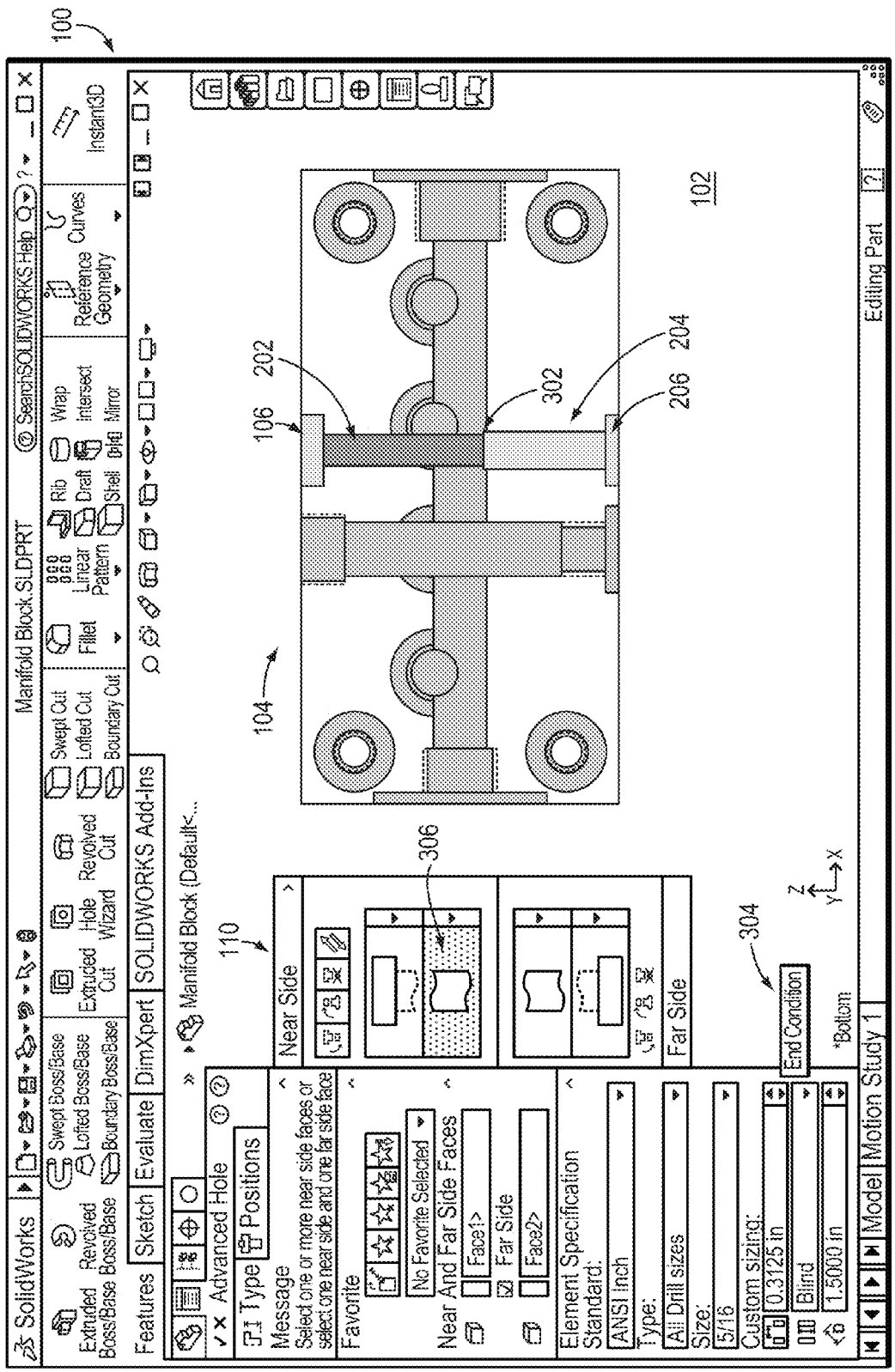
FIGS. 3a and 3b are an illustration of a three-dimensional part in an embodiment of the present invention.
Figure 3B:
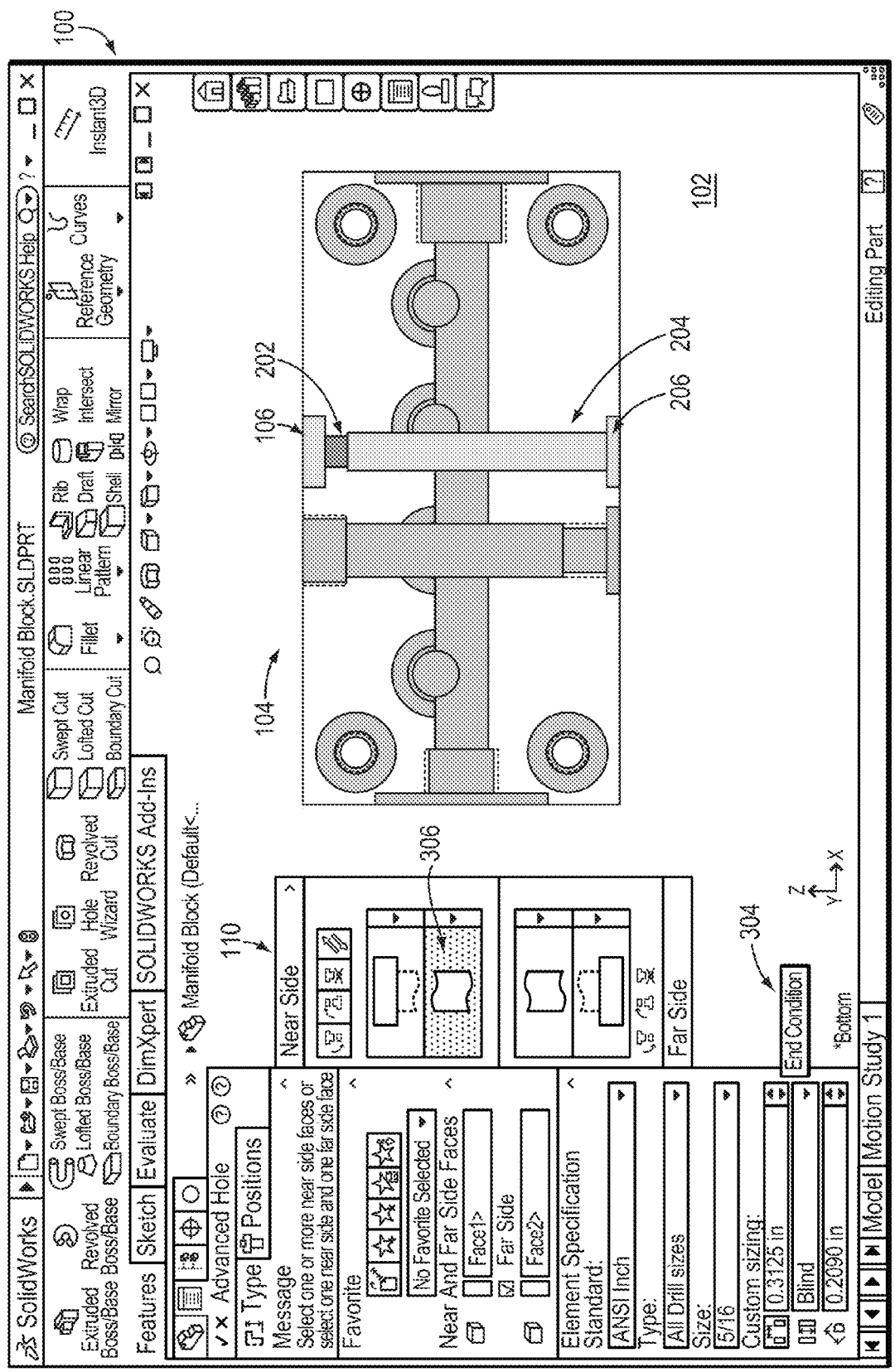

Referring now to FIGS. 3a and 3b, a bottom view of the part 104 is shown. In FIG. 3a, the middle hole elements 202, 204 of the multi-element hole feature meet close to the middle 302 of the 3D part model 104. This is determined by the value of the Blind end condition 304, which is set to 1.5 inches for the active hole element 202, a depiction 306 of which is highlighted in the UI fly-out 110. In FIG. 3b, the Blind end condition 304 is set to 0.2090 inches for the active hole element 202, and thus, the depth of active hole element 202 as shown in FIG. 3b is less than as shown in FIG. 3a. The depth of the other middle hole element 204 reaches up to the active hole element 202 due to an up-to-next element end condition, which will be discussed.

As discussed, during the manufacturing process holes may be drilled from different directions. Drilling a hole from different directions can help meet the dimension and tolerance requirements of the design. However, having hole elements properly meet may present problems. To address this problem, the present invention can automatically calculate depth values of hole elements and automatically update the hole geometry in real time such that one hole element's geometry continues up to and meets the geometry of the next consecutive hole element.

Rather than explicitly specifying a depth of a hole element, an embodiment automatically adjusts the depth parameter of one hole element in relationship to another hole element. An up-to-next element end condition may be set for one or more middle hole elements. The up-to-next element end condition causes the depth of a respective hole element to automatically extend up to and no farther than an adjoining hole element. Thus, when the depth of the adjoining element is set or changed, the depth of the hole element having the up-to-next element end condition is automatically changed to extend to the adjoining hole element and no further.

Figure 4:
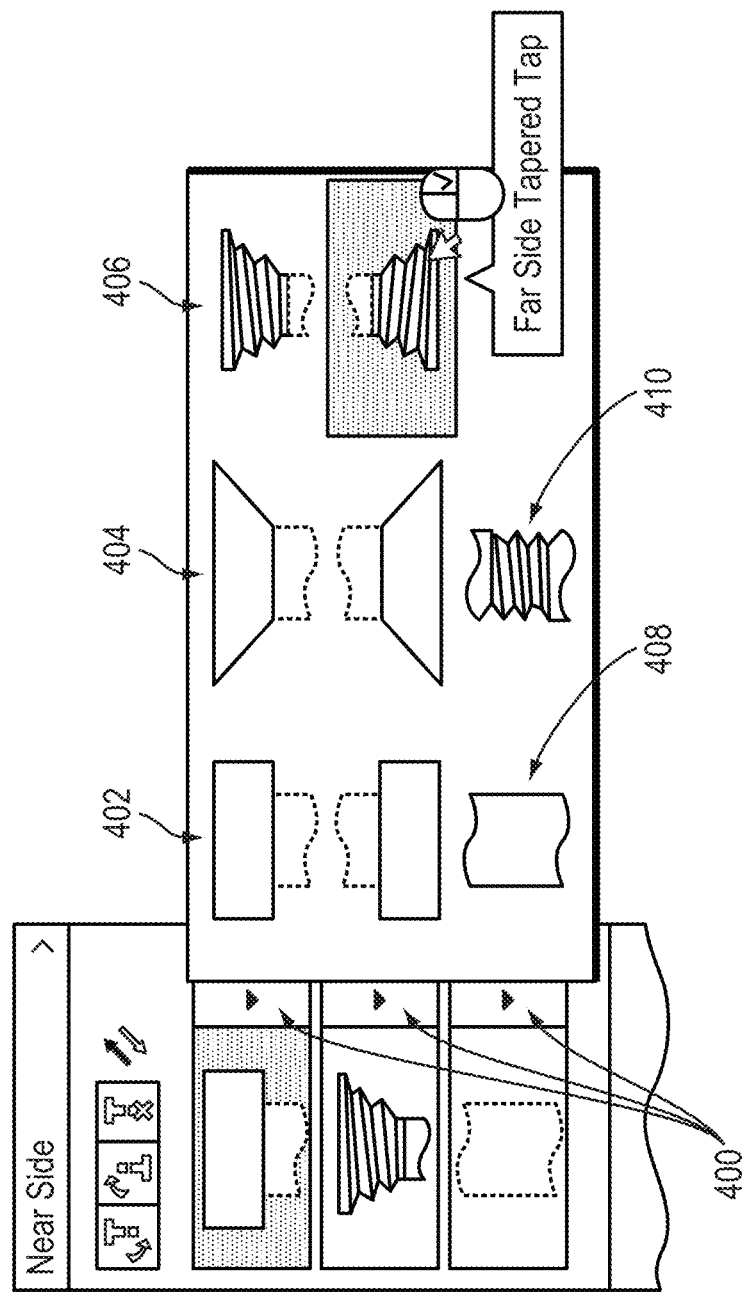
FIG. 4 is an illustration of types of hole elements.

As shown in FIG. 4, an embodiment enables a user to select from five different types of hole elements from pull-down menus 400. The types are a counterbore type 402, a countersink type 404, a tapered threaded type 406, a straight type 408, and a straight threaded type 410. The fly-out menu 400 also includes three far-side elements, which are mirrored instances of the near-side counterbore type 402, countersink type 404, and tapered threaded type 406.

Figure 5:
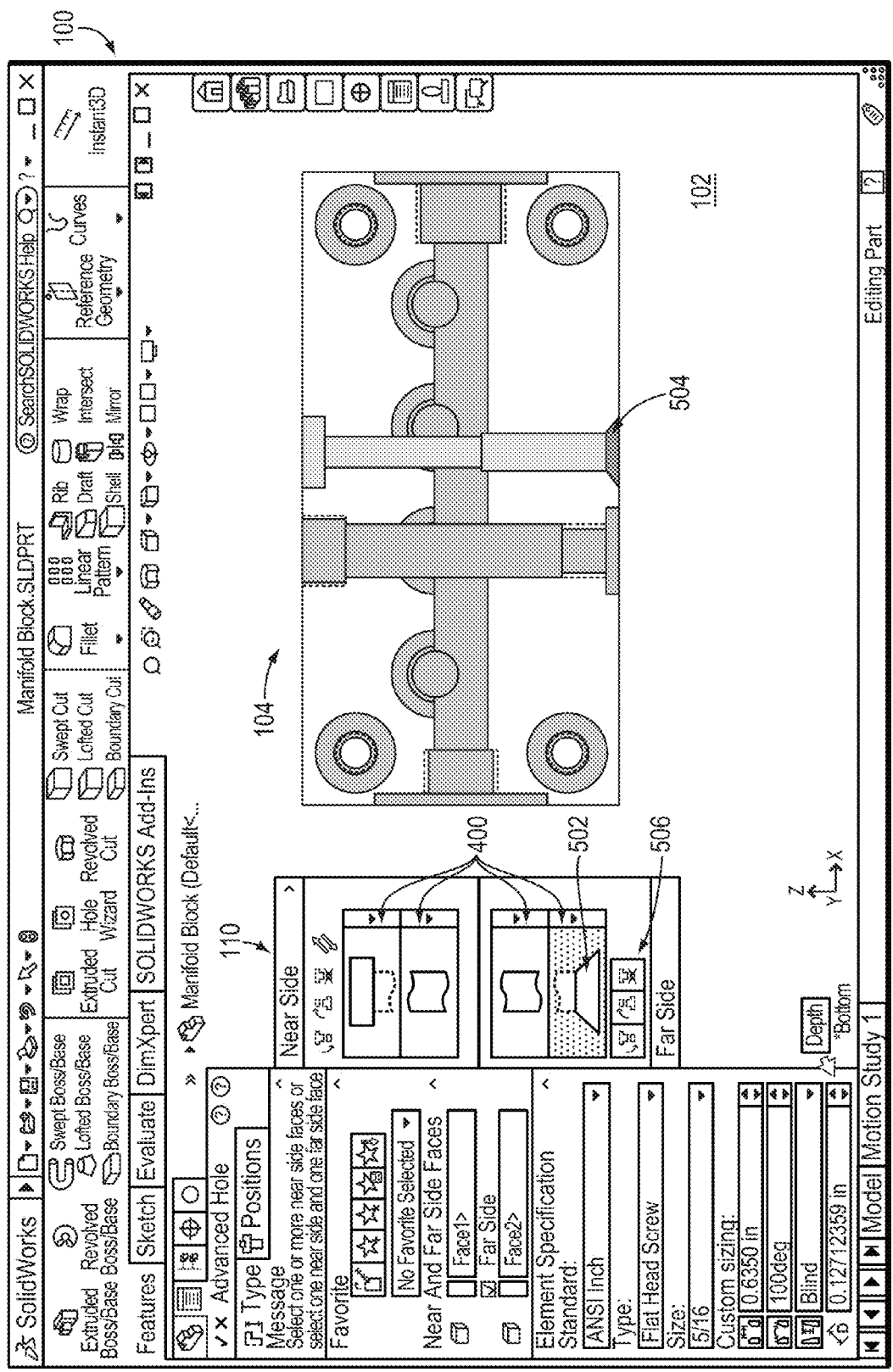
FIG. 5 is an illustration of a countersink hole element.

As shown in FIG. 5, one type of hole element may be easily substituted for another type of hole element. In FIG. 5, a countersink element icon 502 has been specified in UI fly-out 110. The user may have first deleted the counterbore hole element 206 shown in FIGS. 3a and 3b by selecting the delete icon 506. Then after selecting the countersink element icon 502 from the lowest of the pull-down menus 400, the countersink element 504 is inserted. In an embodiment, simply selecting another type of element from a pull-down menu 400 substitutes an element of that selected type for the current element in that stack position without having to select the delete icon 506.

The present invention creates a single sketch for a multi-element hole and thereafter creates a single feature by applying a modeling operation to the single sketch. The present invention creates an initial sketch for a first hole element. When a second hole element is specified, the initial sketch is modified to include the sketch entities for the second hole element such that the sketch entities for the first hole element and the sketch entities for the second hole element are stacked on one another. The sketch may be modified by adding additional sketch entities to the existing single sketch or by recreating the single sketch with sketch entities from both the first and second hole elements to form the single sketch. As one or more additional hole elements are included in the multi-element hole, sketch entities for those additional hole elements are included in the single sketch in a stacked arrangement. Furthermore, contiguous elements may not meet one another, in which case, connector sketch entities are created and included in the single sketch.

FIG. 6 is a table 600 that includes a list of hole element types available in an embodiment of the present invention. Additionally, the table 600 illustrates for each element type the sketch entities that are created and the default dimensions for a particular size. In an embodiment, the sketches may be created by calling a software function that creates a respective sketch in real-time given a set of parameter values (e.g., dimensions), which may be input by a user. In the right-hand column of table 600, a list of constraints is also shown. The types of constraints in the list will control the sketch entities created for the particular element types.

As described, the present invention creates a single sketch for a multi-element hole, and modifies the sketch to incorporate in a stacked arrangement of sketch entities for subsequently added hole elements. When the last sketch entity in a first hole element coincides (or is in close proximity to coinciding) and is collinear with the first sketch entity in a second hole element, and the radii of hole elements are equal as measured from the same axis, the last and first sketch entities of the first and second elements, respectively, are retained in an updated sketch. These last and first sketch entities may have separate coincident endpoints or may share the same endpoint. Although, the two collinear sketch entities may appear as a single straight line, retaining the two collinear sketch entities allows parameters and properties of the separate sketch entities to easily be maintained (e.g., dimensions and tolerances). However, embodiments may create a single entity to replace two coincident, collinear entities belonging to different hole elements.

Figure 7A:
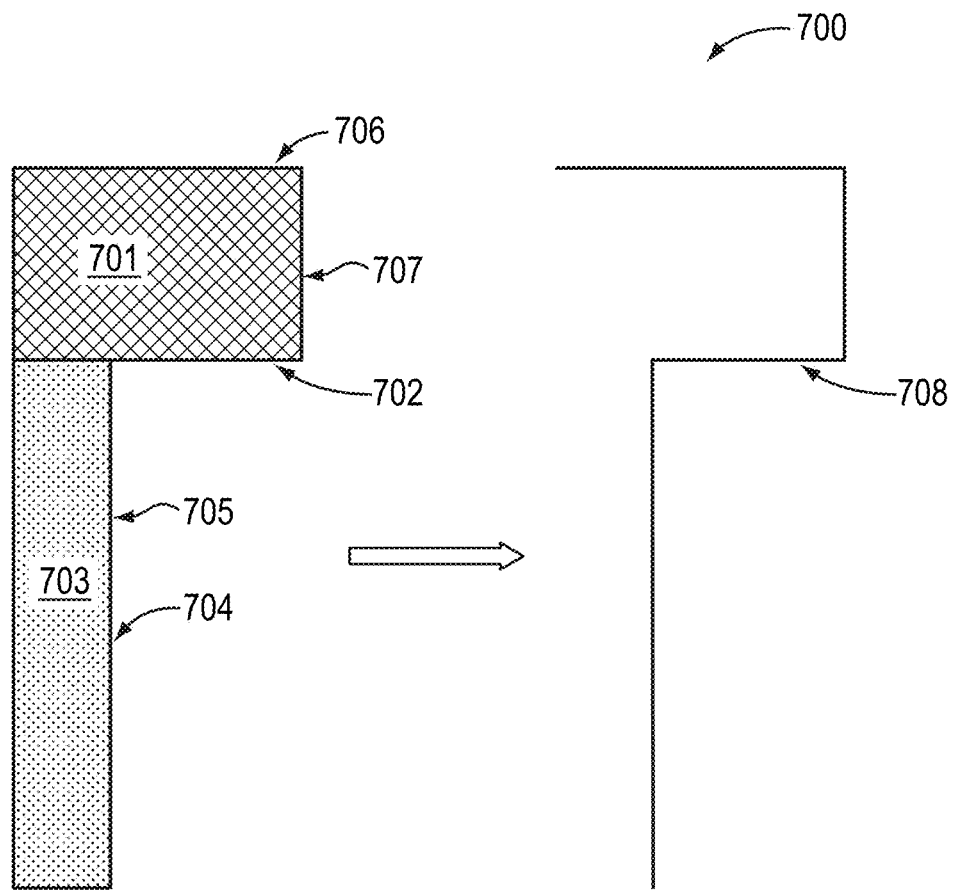
FIGS. 7a and 7b are illustrations of creating a single sketch in an embodiment of the present invention.

FIG. 7a illustrates how a single sketch 700 is created in an embodiment of the present invention when two hole elements are not collinear and the second sketch entity's radius is less than the first sketch entity's radius. The single sketch 700 was created from two hole elements 701, 703. In FIG. 7a, an initial sketch was created for the first hole element 701 comprised of three sketch entities 702, 706, 707. To include the second hole element 703 in the single sketch 700, the lower sketch entity 702 in the first hole element 701 is deleted and a new sketch entity 708 is created.

A sketch entity in a hole element to be added to a single sketch may not be coincident with a sketch entity that is already part of the single sketch, however. Therefore, a connector sketch entity is created to connect the two disconnected sets of sketch entities, each of which is associated with a different hole element. In an embodiment, a horizontal line segment is created to serve as a connecting sketch entity between the last sketch entity in an existing hole element and the first sketch entity in the hole element being added. This horizontal line segment will become a face once a 3D modeling operation is applied serving as a transition between the differing diameters of one hole element and another hole element.

Figure 7B:
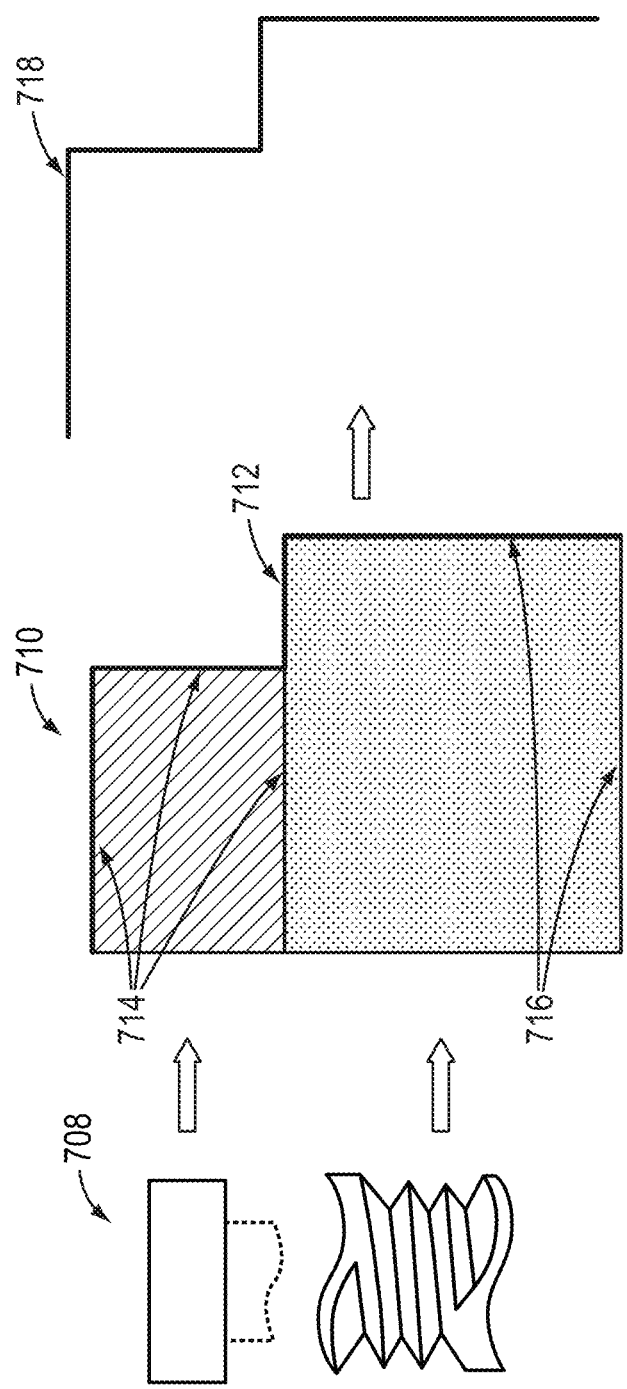

FIG. 7b shows an image 708 of two hole elements, which are visually similar to the icons selected from the UI pull-down menus 400 (shown in FIGS. 4 and 5) when creating the hole elements. The radius of the upper hole element is less than that of the lower hole element. Thus, the single sketch 718 of a multi-element hole will need to include a connecting sketch entity 712 to combine the upper element sketch entities 714 and the lower element sketch entities 716 in the single sketch 718. The connecting sketch entity 712 replaces the lower entity of the upper element sketch entities 714 (upper 716 is not drawn) has one endpoint coincident to the last endpoint of the upper element sketch entities 714 and the other endpoint coincident to a first endpoint of the lower element sketch entities 716. Furthermore, the connecting sketch entity 712 is constrained horizontally. When the depth of a hole element is changed, the horizontal constraint aids in the solution of a fully defined sketch. A 2D sketch solver may be employed to propagate a modification in one hole element to all hole elements in a multi-element hole.

Figure 8:
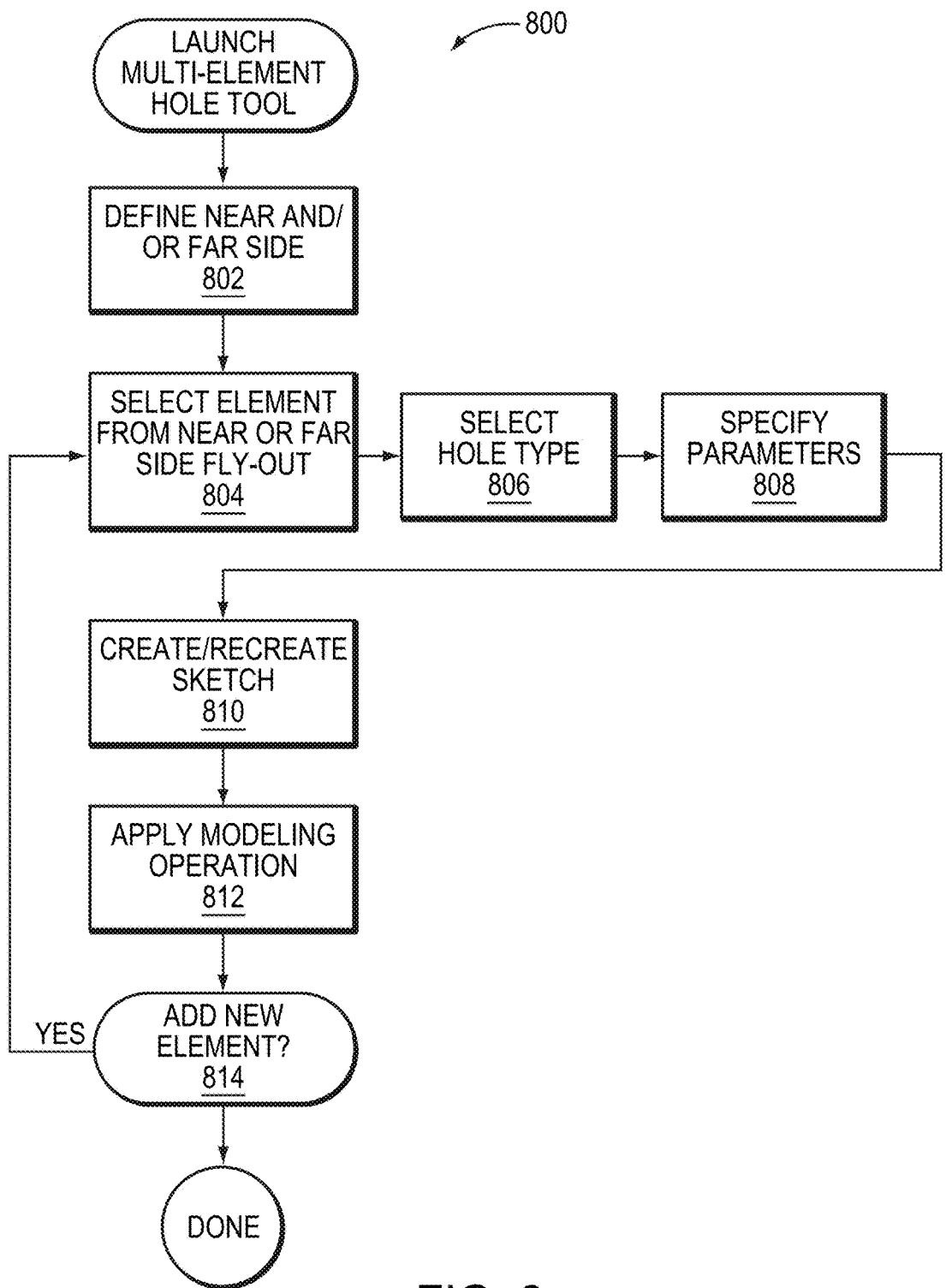
FIG. 8 is a flow diagram containing steps that create a multi-element hole in an embodiment of the present invention.

Referring now to FIG. 8, a process 800 is illustrated that creates a multi-element hole. To begin, the near side face on which the hole will be drilled is defined, and if the hole will be drilled from a second side, the far side face is also defined (step 802). A hole element is then selected for inclusion on the near side or on the far side of the UI fly-out 110 (step 804). The hole element in an embodiment may be by default a counterbore type. Thus, in the next step, a type for the first hole element is selected if the default type is not desired (step 806). The type may be selected, for example, from a UI pull-down menu. Parameters for the first hole element are then specified (step 808). Parameters specified for the hole element may include a diameter and a depth, by way of non-limiting example. The depth of a hole element may be calculated automatically using a standard machining convention. An example of such a convention is that a depth of a threaded hole is twice that of the diameter of the threaded hole.

Once the element is selected from the near or far side, the type of hole element is selected, and the parameters are specified, a sketch of the hole element is automatically generated (step 810). In an embodiment, a set of software functions automatically create sketch entities. These software functions create sketch entities given a set of parameters for particular hole types, as has been discussed with reference to FIG. 6. Additionally, one or more software functions are executed to connect two different hole elements. For example, such functions may create a transition between hole elements having the same diameter and center axis, between hole elements having different diameters and the same center axis, and between hole elements sharing a coincident point attached to non-collinear sketch entities (e.g., the elements meet at an angle). The sketch is created with number of constraints and dimensions and submitted to a sketch solver. The sketch solver solves a set of equations which are specified by the constraints and dimensions to generate the final shape of the sketch.

In the next step, an operation is applied to the single sketch to create a multi-element hole feature (step 812). By applying the modeling operation at this stage of process 800, a user receives visual feedback while the 3D multi-element feature is being created. In the next step, if a new element is being added (tested in step 814), process 800 allows a near or far side element to be selected, and another hole type and a set of parameters to be specified (steps 804-808). Then the entire sketch is recreated (step 810). Thus during every iteration (steps 804-814) the sketch from the previous iteration is discarded and a new sketch is created from the beginning.

Additionally, whenever the multi-element hole feature is modified, the single sketch is recreated or regenerated. Modification may take the form of adding, deleting, or rearranging one or more elements, in which case the sketch is recreated. When a parameter of an element is changed, such as a depth, an angle, or a dimension by way of non-limiting example, the sketch is regenerated. After the multi-element feature is modified, an operation is applied to the new single sketch to create a modified multi-element feature.

In an embodiment, the sketch is not visible to the user unless an error preview is displayed, which will later be discussed, or the user explicitly chooses to view the underlying sketch.

A number of extensions to the process 800 are possible. For example, in embodiments of the present invention tolerance values are defined for one or more elements of the multi-element feature. Furthermore, a callout that annotates a tolerance value for a respective element is displayed on a computer screen. Each hole combination has a unique identifier that a callout may reference, enabling the callout to request data regarding a hole element and populate appropriately.

In an embodiment, the single sketch of the multi-element hole feature is divided into two subgroups; one group corresponds to a near side section of hole elements and the other group corresponds to a far side section of hole elements. Each of these subgroups contains a set of sketch entities corresponding to each hole element in the subgroup along with the connector entities that connect the hole elements.

When creating or updating the single sketch, the sketch entities in one subgroup are created independently of the sketch entities in the other subgroup. The sketch entities belonging to each subgroup are also updated independently as applicable. The entities in the different subgroups are then joined using the up-to-next element end condition, as has been discussed.

Moreover, an embodiment determines if only one of (a) the hole element in the near side section that is furthest from the near side face, and (b) the hole element in the far side section that is furthest from the far side face has an up-to-next element end condition. (These are the hole elements to be joined.) If so, with the exception of the hole element that has the up-to-next element end condition, the sketch entities corresponding to all hole elements in one subgroup are created and updated (as applicable), as are the sketch entities corresponding to all hole elements in the other subgroup, and the subgroups are created and updated independently of each other; then if the two hole elements to be joined have different diameters, the sketch entities of those hole elements are connected by a line entity with a horizontal constraint (as discussed with reference to FIG. 7*b*); if on the other hand, the two hole elements to be joined have the same diameter, respective end points from each of the hole elements are merged into a single point or become coincident (e.g., to easily maintain the parameters and properties).

Furthermore, if both elements to be joined have up-to-next element end conditions, with the exception of these hole elements, the sketch entities of the remaining hole elements are created and updated (as applicable) and those in one subgroup independently of those in the other subgroup; the length of each end element is computed by subtracting the sum of the lengths of all elements of near and far side sections from the overall length between the near and far side faces and dividing the result value by two.

At times during the construction of a multi-element feature, a failure may occur. A failure may occur when a constraint cannot be solved by the 2D sketch solver or a modeling operation produces an error. To solve the problem of locating and resolving the cause of a failure in a multi-element feature, the present invention automatically displays a wireframe preview of the multi-element feature when an error occurs. The purpose of the wireframe preview is to make the failure readily apparent to a user, and thereby, help the user discover which element of the multi-element feature is causing the failure.

Figure 9:
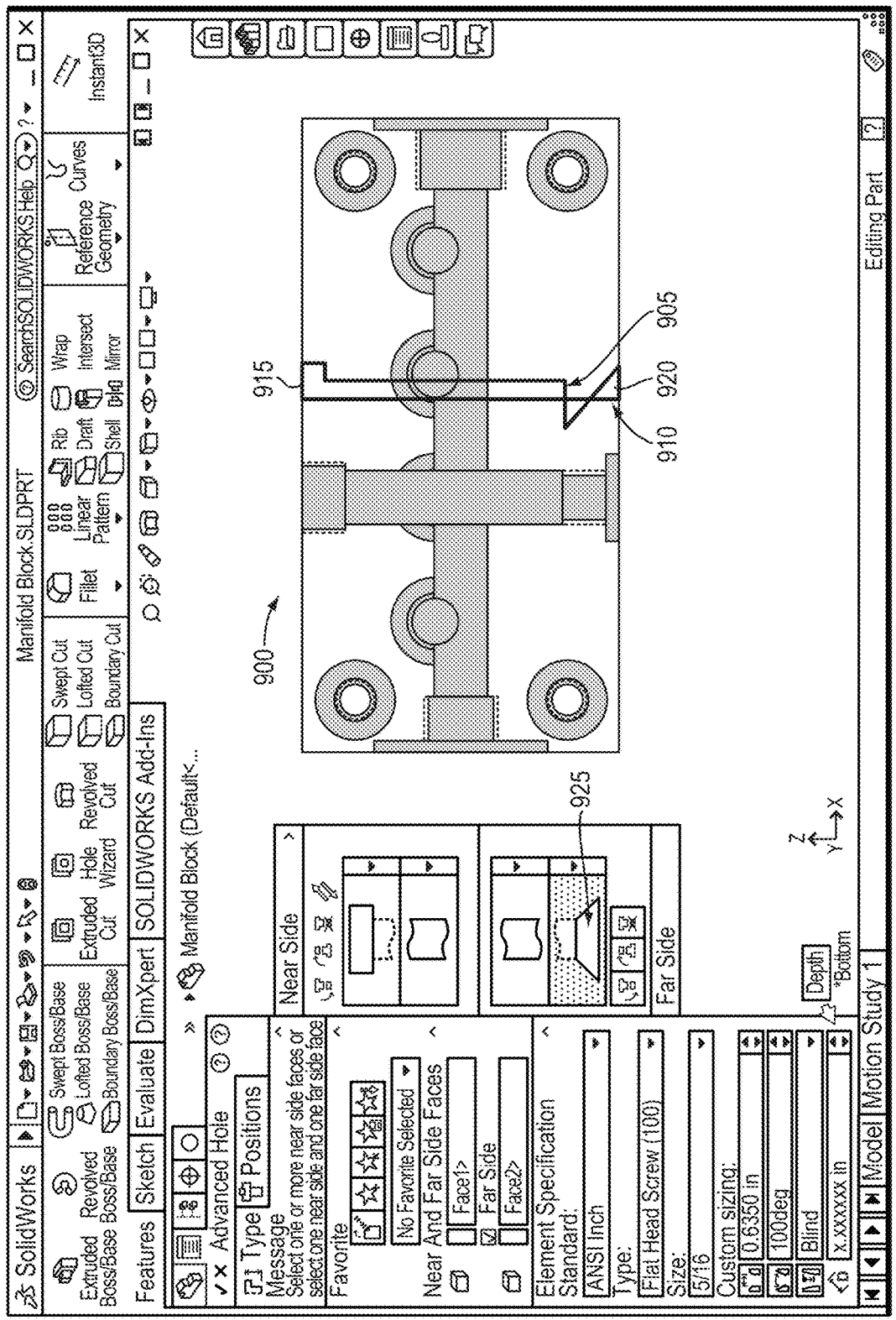
FIG. 9 is an illustration of a wireframe preview in an embodiment of the present invention.

Referring now to FIG. 9, an illustration of a wireframe preview highlighting a design error is shown. The wireframe preview 900 uses the underlying sketch of the multi-element feature to create a wireframe representation of the multi-element feature. In FIG. 9, horizontal edge 905 crosses the center axis 910. To successfully revolve a sketch, all lines that make up the sketch need to be on the same side of the center axis 910. The wireframe preview 900 clearly shows edge 905 crossing the center axis 910. Increasing the depth of the upper hole element 915 or decreasing the depth of the lower hole element 920 will resolve the error. Furthermore, an embodiment may highlight the element most likely causing the error in the user interface or on the sketch. In FIG. 9, the highlighted hole element icon 925 in the UI is highlighted and most likely the cause of the error. Highlighting in such a way draws the user's attention to the element causing the error.

Embodiments of the present invention offer many advantages over the prior art. Advantages of the present invention include the construction of a single sketch, which alleviates the effort required by a user to recreate individual sketches and features for each hole element. Another advantage over the prior art is the ease in which an element may be replaced with an element of a different type and the ease in which elements may be reordered.

Yet another advantage of the present invention over the prior art is the detection and visualization of errors, enabling a user to easily correct errors. As should be apparent, the wireframe preview capabilities described with reference to FIG. 9 enable a user to diagnose and resolve an error without extreme difficulty. By making an error readily apparent to a user, the present invention helps the user hone in on the one element in the multi-element feature causing the error.

Additionally, the up-to-next element end condition helps a user avoid first creating a feature with the desired elements and then manually calculating the required depths for one or more middle elements in a near and far side complex multi-element feature, or end elements if the end elements are the only two elements in the multi-element feature and one is on the near side and one is on the far side face. Additionally, if there are three elements in the multi-element feature, only one of the end elements may have the up-to-next element end condition and only if it is the only element in either the near side or far side face section.

Further advantages include a decrease in the overall design time by making multi-element feature construction much faster, and a simpler and quicker means to modify a multi-element feature at a later design stage.

A number of embodiments of the present invention have been described. Nevertheless, it will be understood by those skilled in the art that various modifications may be made within the boundaries of the invention. For example, embodiments of the present invention also allow for other complex features to be created. The methods described herein may be applied to create interesting revolved geometry, slots, and non-circular cuts. Moreover, the sketches described in FIGS. 7a and 7b are illustrated using straight lines; however, one skilled in the art may easily extend the implementation of adding elements to a multi-element feature to elements comprised of arcs and other curved entities.

Furthermore, depending on the needs of an implementation, particular operations described herein may be implemented as a combined operation, eliminated, added to, or otherwise rearranged. In process 800 by way of non-limiting example, the modeling step 812 may be executed after all elements of the multi-element feature are included in the sketch (i.e., after step 814). Additionally, in an embodiment, the sketch may be modified instead of being recreated by adding additional elements to the sketch when a transition between hole elements and sketch entities thereof naturally form a continuum.

Computer Support

Figure 10:
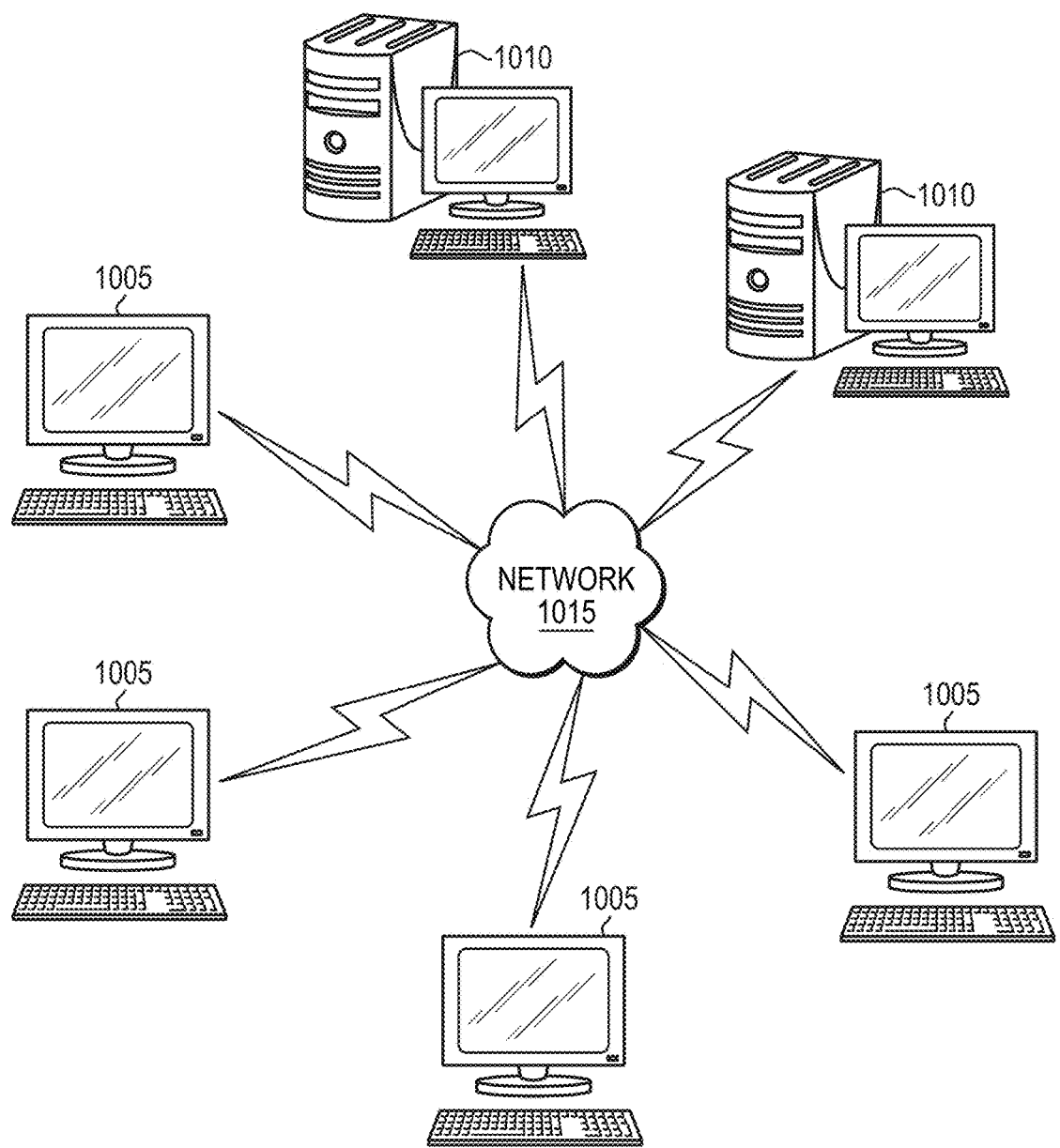
FIG. 10 is a schematic diagram of a computer system network embodying the present invention.

FIG. 10 illustrates a computer network or similar digital processing environment in which the present invention may be implemented.

Client computer(s)/device(s) 1005 and server computer(s) 1010 provide processing, storage, and input/output, and execute application programs and the like. Client computer(s)/device(s) 1005 can also be linked through communications network 1015 to other computing devices, including other client computer(s)/device(s) 1005 and server computer(s) 1010. Communications network 1015 can be part of a remote access network, a global network (e.g., the Internet), a worldwide collection of computers, local area or wide area networks, gateways, and cloud computing that currently use respective protocols (TCP/IP, Bluetooth, etc.) to communicate with one another. Other electronic computer/device network architectures are suitable.

Figure 11:
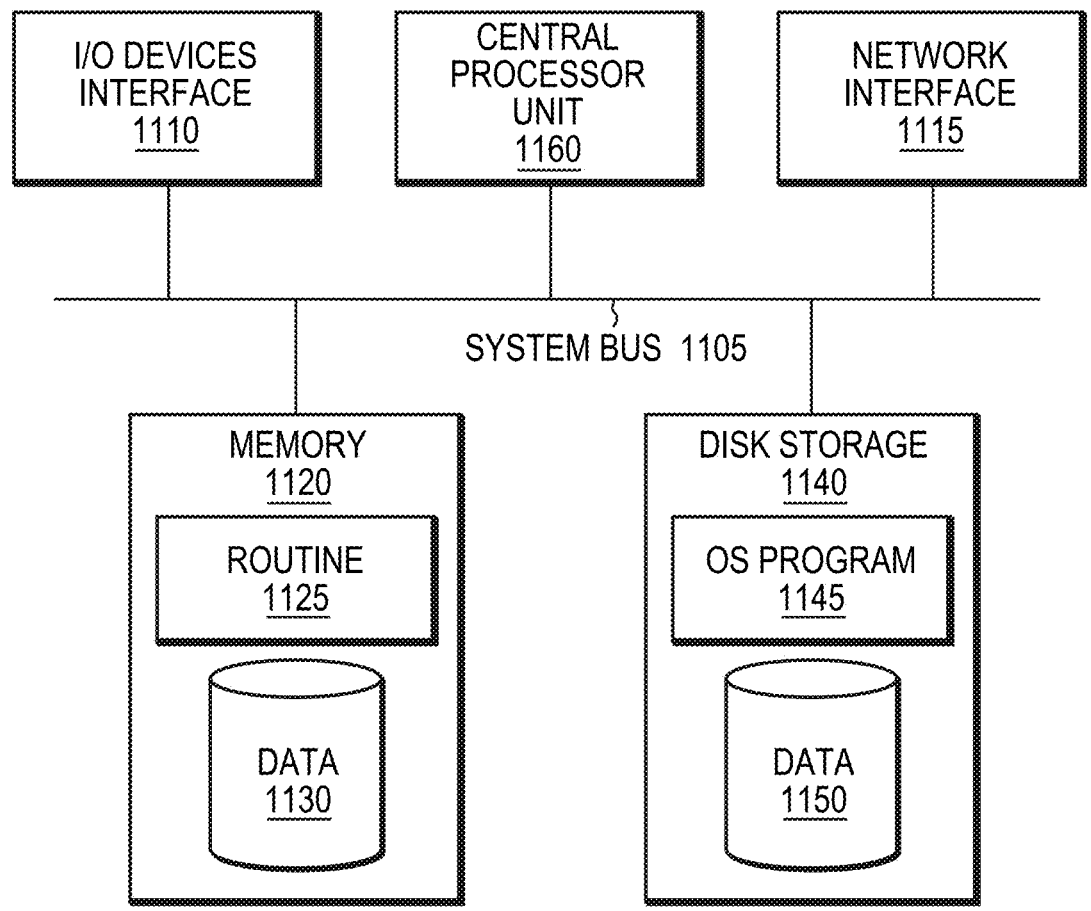
FIG. 11 is a block diagram of a computer system embodying the present invention.

FIG. 11 is a diagram of the internal structure of a computer (e.g., client computer/device 1005 or a server computer 1010) in the computer network of FIG. 10. Each computer 1005, 1010 contains system bus 1105, where a bus is a set of hardware lines used for data transfer among the components of a computer or processing system. System bus 1105 is essentially a shared conduit that connects different elements of a computer system (e.g., processor, disk storage, memory, input/output ports, network ports, etc.) and enables the transfer of information between the elements. Attached to system bus 1105 is I/O device interface 1110 for connecting various input and output devices (e.g., keyboard, mouse, displays, printers, speakers) to the computer 1005, 1010. Network interface 1115 allows the computer to connect to various other computer(s)/device(s) attached to a network (e.g., network 1015 of FIG. 10). Memory 1120 provides volatile storage for computer software instructions 1125 and data 1130 used to implement an embodiment, such as the CAD system of the present invention (e.g., window 100, property manager 108, process 800, and supporting software code and data structures described herein). Disk storage 1140 provides non-volatile storage for computer software instructions 1125 and data 1130 used to implement an embodiment of the present invention. Central processor unit 1160 is also attached to system bus 1105 and provides for the execution of computer instructions.

In one embodiment, the software instructions 1125 and data 1130 are generated by a computer program product. The computer program product may include a computer readable medium such as a removable storage medium (e.g., one or more DVD-ROM's, CD-ROM's, diskettes, tapes), a memory medium, and the like. The computer program product provides at least a portion of the software instructions for the present invention. The computer program product can be installed by any suitable software installation procedure, as is well known in the art. In another embodiment, at least a portion of the software instructions may also be downloaded over a cable, communication, and/or wireless connection. In other embodiments, the software 1125 and data 1130 are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 1125.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product is a propagation medium that the computer/device 1005, 1010 may receive and read, such as by receiving the propagation medium and identifying a propagated signal embodied in the propagation medium, as described above for computer program propagated signal product.

What is claimed is:

1. A computer-implemented method for constructing a multi-element feature in a three-dimensional (3D) computer-aided design (CAD) model, the method comprising:
    selecting a first element and a second element to include in the multi-element feature;
    creating a single sketch defining a shape of the multi-element feature, wherein:
        the single sketch includes a set of sketch entities;
        the first element is defined by a first subset of the sketch entities; and
        the second element is defined by a second subset of the sketch entities;
    adding to the set of sketch entities a connection entity, wherein the connection entity joins the first element and the second element;
    creating in the single sketch a first subgroup corresponding to elements of the multi-element feature and a second subgroup corresponding to other elements of the multi-element feature, wherein:
        the first subgroup contains the first subset of sketch entities and a third subset of sketch entities defining a third element; and
        the second subgroup contains the second subset of sketch entities and a fourth subset of sketch entities defining a fourth element;
    updating the sketch entities of the first subgroup and the sketch entities of the second subgroup independently;

joining the sketch entities of the first subgroup and the sketch entities of the second subgroup by implementing an up-to-next element end condition; and constructing the multi-element feature in the 3D CAD model by applying a modeling operation to the single sketch.

2. The computer-implemented method of claim 1, further comprising:

selecting an additional element to include in the multi-element feature; and one of (a) recreating the single sketch to include additional sketch entities defining a profile of the additional element, and (b) adding to the set of sketch entities the additional sketch entities defining a profile of the additional element.

3. The computer-implemented method of claim 1, wherein:

if the first element and the second element share a same center axis, and an end sketch entity in the first subset of the sketch entities and a beginning sketch entity in the second subset of the sketch entities are a same distance from the same center axis and collinear, then the connection entity is one of (a) a single sketch entity that replaces the end sketch entity in the first subset of the sketch entities and the beginning sketch entity in the second subset of the sketch entities, (b) the same point, and (c) two coincident points.

4. The computer-implemented method of claim 1, wherein the connection entity is a new sketch entity that joins an end sketch entity in the first subset of the sketch entities and a beginning sketch entity in the second subset of the sketch entities.

5. The computer-implemented method of claim 1, wherein:

the end condition causes an automatic update in the second element when a parameter of the first element changes; and the automatic update keeps the first element and the second element joined.

6. The computer-implemented method of claim 1, further comprising:

detecting an error condition in the single sketch; and displaying a wireframe preview of the single sketch, wherein the wireframe preview visually depicts the error.

7. The computer-implemented method of claim 1, further comprising reordering the first element and the second element, wherein reordering recreates the single sketch with the first subset of the sketch entities and the second subset of the sketch entities rearranged accordingly.

8. A non-transitory computer-readable data storage medium comprising instructions causing a computer to:

enable selection of a first element type and a second element type to include in a multi-element feature in a three-dimensional (3D) computer-aided design (CAD) model;

enable specification of specify parameters for the first element type and the second element type;

construct a single sketch defining a shape of the multi-element feature, wherein:

the single sketch includes a first subset of sketch entities defining the first element, a second subset of entities defining the second element, and a connecting entity, wherein the connecting entity joins the first element and the second element in the single sketch;

create in the single sketch a first subgroup corresponding to elements of the multi-element feature and a second subgroup corresponding to other elements of the multi-element feature, wherein:

the first subgroup contains the first subset of sketch entities and a third subset of sketch entities defining a third element; and the second subgroup contains the second subset of sketch entities and a fourth subset of sketch entities defining a fourth element;

update sketch entities of the first subgroup and the sketch entities of the second subgroup independently;

join the sketch entities of the first subgroup and the sketch entities of the second subgroup by implementing an up-to-next element end condition; and apply a modeling operation to the single sketch to create the multi-element feature.

9. The computer-readable data storage medium of claim 8, further comprising instructions to:

select an additional element to include in the multi-element feature; and recreate the single sketch by including the first subset of sketch entities, the second subset of entities, a set of additional sketch entities defining a profile of the additional element, and a set of connection entities to join the first element, the second element, and the additional element.

10. The computer-readable data storage medium of claim 8, wherein:

the connection entity is a new sketch entity that joins an end sketch entity in the first subset and a beginning sketch entity in the second subset if a distance from a center axis differs for the end sketch entity in the first subset and the beginning sketch entity in the second subset; and the connection entity is one of a single sketch entity that replaces the end sketch entity in the first subset and the beginning sketch entity in the second subset, a same point, and two coincident points if:

(a) the first element and the second element share the same center axis, and (b) the end sketch entity in the first subset and the beginning sketch entity in the second subset (i) are a same distance from the same center axis, and (ii) have one of a same direction and an opposite direction.

11. The computer-readable data storage medium of claim 8, wherein the end condition causes the second element to automatically update when a parameter of the first element changes, wherein automatically updating (a) modifies the second element to keep the first element and the second element joined, and (b) modifies the first subset of the sketch entities and the second subset of the sketch entities accordingly.

12. The computer-readable data storage medium of claim 8, further comprising instructions to:

detect an error condition in the single sketch; and display a wireframe preview of the single sketch, wherein the wireframe preview visually depicts the error.

13. The computer-readable data storage medium of claim 8, further comprising instructions to:

receive a command to reorder the first and the second elements; and rearrange the first subset of the sketch entities and the second subset of the sketch entities in the single sketch.

14. A computer-aided design system comprising:
a processor operatively coupled to a data storage system, the data storage system storing a three-dimensional model; and
a data storage memory operatively coupled to the processor and comprising instructions to configure the processor to:
enable selection of a first element type and a second element type for inclusion in a multi-element feature in a three-dimensional (3D) computer-aided design (CAD) model;
enable specification of parameters for the first element type and the second element type;
construct a single sketch defining a shape of the multi-element feature, wherein:
the single sketch includes a first subset of sketch entities defining a first element that is of the first element type, a second subset of entities defining a second element that is of the second element type, and a connection entity, wherein the connection entity joins the first element and the second element in the single sketch;
create in the single sketch a first subgroup corresponding to elements of the multi-element feature and a second subgroup corresponding to other elements of the multi-element feature, wherein:
the first subgroup contains the first subset of sketch entities and a third subset of sketch entities defining a third element; and
the second subgroup contains the second subset of sketch entities and a fourth subset of sketch entities defining a fourth element;
update sketch entities of the first subgroup and the sketch entities of the second subgroup independently;
join the sketch entities of the first subgroup and the sketch entities of the second subgroup by implementing an up-to-next element end condition; and
create the multi-element feature by applying a modeling operation to the single sketch.

15. The computer-aided design system of claim 14, further comprising instructions to configure the processor to:
select an additional element to include in the multi-element feature; and
modify the single sketch by one of (a) recreating the single sketch to include additional sketch entities defining a profile of the additional element, and (b) adding to the set of sketch entities the additional sketch entities defining a profile of the additional element.

16. The computer-aided design system of claim 14, wherein the connection entity is one of a single sketch entity that replaces an end sketch entity in the first subset and a beginning sketch entity in the second subset, a same point, and two coincident points, if:
(a) the first element and the second element share the same center axis, and
(b) the end sketch entity in the first subset and the beginning sketch entity in the second subset are (i) a same distance from the same center axis, and (ii) collinear.

17. The computer-aided design system of claim 14, wherein the connection entity is a new sketch entity that joins an end sketch entity in the first subset and a beginning sketch entity in the second subset if a distance from a center axis differs for the end sketch entity and the beginning sketch entity.

18. The computer-aided design system of claim 14, wherein the end condition causes the second element to automatically update when a parameter of the first element changes, wherein automatically updating modifies a parameter of the second element to keep the first element and the second element joined.

19. The computer-aided design system of claim 14, further comprising instructions to configure the processor to:
receive a command to reorder the first and the second elements; and
recreate the single sketch wherein the first subset of the sketch entities and the second subset of the sketch entities are reordered in the single sketch.

* * * * *

UNITED STATES PATENT AND TRADEMARK OFFICE
CERTIFICATE OF CORRECTION

PATENT NO. : 10,430,524 B1
APPLICATION NO. : 15/447774
DATED : October 1, 2019
INVENTOR(S) : Jody Todd Stiles, Satish Rao Kanjarkar and Sachin Darwatkar Page 1 of 1

It is certified that error appears in the above-identified patent and that said Letters Patent is hereby corrected as shown below:

In the Claims

In Column 13, Claim 8, Line 58 delete "specify".

Signed and Sealed this
Nineteenth Day of November, 2019

Andrei Iancu
*Director of the United States Patent and Trademark Office*